United States Patent
Park et al.

(10) Patent No.: US 9,024,934 B2
(45) Date of Patent: May 5, 2015

(54) PIXEL AND ORGANIC LIGHT EMITTING DISPLAY USING THE SAME

(71) Applicant: Samsung Display Co., Ltd., Yongin, Gyeonggi-Do (KR)

(72) Inventors: Ok-Kyung Park, Yongin (KR); Dong-Hwi Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 151 days.

(21) Appl. No.: 13/668,734

(22) Filed: Nov. 5, 2012

(65) Prior Publication Data

US 2014/0028648 A1 Jan. 30, 2014

(30) Foreign Application Priority Data

Jul. 25, 2012 (KR) .................. 10-2012-0081258

(51) Int. Cl.
*G09G 3/30* (2006.01)
*G06F 3/038* (2013.01)
*G09G 3/32* (2006.01)

(52) U.S. Cl.
CPC ...... *G09G 3/3233* (2013.01); *G09G 2300/0819* (2013.01); *G09G 2300/0852* (2013.01); *G09G 2300/0861* (2013.01); *G09G 2310/0251* (2013.01); *G09G 2310/0262* (2013.01); *G09G 2320/0233* (2013.01); *G09G 2320/043* (2013.01)

(58) Field of Classification Search
CPC ............. G09G 3/30; G09G 3/32; G06F 3/038

USPC ....................... 345/211–212, 76–79
See application file for complete search history.

(56) References Cited

U.S. PATENT DOCUMENTS

| 2006/0114193 | A1* | 6/2006 | Kwak et al. ............... 345/76 |
| 2007/0024540 | A1* | 2/2007 | Ryu et al. ................. 345/76 |
| 2010/0013816 | A1 | 1/2010 | Kwak |
| 2010/0156762 | A1* | 6/2010 | Choi ........................ 345/76 |
| 2011/0141000 | A1* | 6/2011 | Han et al. ................. 345/82 |
| 2011/0148855 | A1* | 6/2011 | Kim et al. ............... 345/214 |
| 2012/0105495 | A1 | 5/2012 | Choi |
| 2013/0002632 | A1 | 1/2013 | Choi |

FOREIGN PATENT DOCUMENTS

| KR | 10-2010-0009219 | 1/2010 |
| KR | 10-2012-0044503 | 5/2012 |
| KR | 10-2013-0007214 A | 1/2013 |

\* cited by examiner

*Primary Examiner* — Kathy Wang-Hurst
*Assistant Examiner* — Dzung T Hoang
(74) *Attorney, Agent, or Firm* — Robert E. Bushnell, Esq.

(57) ABSTRACT

A pixel capable of displaying an image with uniform brightness. The pixel includes an organic light emitting diode (OLED), a first transistor controlling an amount of current that flows from a second node coupled to a first power supply to a second power supply via the OLED to correspond to a voltage applied to a first node, a second transistor coupled between the first node and an initializing power supply, and a third transistor turned on to supply a predetermined voltage to the second node at the moment when the second transistor is turned on.

17 Claims, 5 Drawing Sheets

PIXEL AND ORGANIC LIGHT EMITTING DISPLAY USING THE SAME

CLAIM OF PRIORITY

This application makes reference to, incorporates the same herein, and claims all benefits accruing under 35 U.S.C. §119 from an application for PIXEL AND ORGANIC LIGHT EMITTING DISPLAY USING THE SAME earlier filed in the Korean Intellectual Property Office on 25 Jul. 2012 and there duly assigned Serial No. 10-2012-0081258

BACKGROUND OF THE INVENTION

1. Field of the Invention

Embodiments of the present invention relate to a pixel and an organic light emitting display using the same, and more particularly, to a pixel capable of displaying an image with uniform brightness and an organic light emitting display using the same.

2. Description of the Related Art

Recently, various flat panel displays (FPD) capable of reducing weight and volume that are disadvantages of cathode ray tubes (CRT) have been developed. The FPDs include liquid crystal displays (LCD), field emission displays (FED), plasma display panels (PDP), and organic light emitting displays.

Among the FPDs, the organic light emitting displays display images using organic light emitting diodes (OLED) that generate light by re-combination of electrons and holes. The organic light emitting display has high response speed and is driven with low power consumption.

The organic light emitting display includes a plurality of pixels arranged at intersections of a plurality of data lines, scan lines, and power supply lines in a matrix. Each of the pixels commonly includes an organic light emitting diode (OLED) and a driving transistor for controlling the amount of current that flows to the OLED. The pixels generate light components with predetermined brightness components while supplying currents from the driving transistors to the OLEDs to correspond to data signals.

However, in a conventional pixel, when a white gray scale is displayed after realizing a black gray scale as illustrated in FIG. 1, light with lower brightness than desired brightness is generated in a period of about two frames. In this case, an image with desired brightness is not displayed by the pixels to correspond to gray scales so that uniformity in brightness deteriorates and that picture quality of a moving picture deteriorates.

As a result of experiment, deterioration of the response characteristic of the organic light emitting display is caused by the characteristic of the driving transistors included in the pixels. That is, the threshold voltages of the driving transistors are shifted to correspond to voltages applied to the driving transistors in a previous frame period. Due to the shifted threshold voltages, light components with desired brightness components are not generated in a current frame.

SUMMARY OF THE INVENTION

Accordingly, embodiments of the present invention provide a pixel capable of displaying an image with uniform brightness and an organic light emitting display using the same.

In order to achieve the foregoing and/or other aspects of the present invention, an embodiment of the present invention is to provide a pixel, including an organic light emitting diode (OLED), a first transistor for controlling an amount of current that flows from a second node coupled to a first power supply to a second power supply via the OLED to correspond to a voltage applied to a first node, a second transistor coupled between the first node and an initializing power supply, and a third transistor turned on to supply a predetermined voltage to the second node at the moment when the second transistor is turned on.

The predetermined voltage is set as a higher voltage than a voltage of the initializing power supply. The second transistor and the third transistor are turned on when a scan signal is supplied to an (n-1)th (n is a natural number) scan line. The pixel further includes a fourth transistor coupled between the second node and a data line and turned on when a scan signal is supplied to an nth scan line, and a fifth transistor coupled between the first node and a second electrode of the first transistor and turned on when a scan signal is supplied to the nth scan line. The predetermined voltage is a high voltage supplied to the nth scan line.

The pixel further includes a sixth transistor coupled between the second node and the first power supply and turned off when an emission control signal is supplied to an nth emission control line and a seventh transistor coupled between a second electrode of the first transistor and the OLED and turned off when an emission control signal is supplied to the nth emission control line. The predetermined voltage is a voltage of the emission control signal. The pixel further includes a storage capacitor coupled between the first node and the first power supply and a boosting capacitor coupled between the nth scan line and the first node.

Another embodiment of the present invention is to provide an organic light emitting display, including a scan driver for sequentially supplying scan signals to scan lines and for sequentially supplying emission control signals to emission control lines, a data driver for supplying data signals to data lines, and pixels positioned at intersections of the scan lines and the data lines. Each of the pixels positioned on an nth (n is a natural number) horizontal line includes an OLED, a first transistor for controlling an amount of current that flows from a second node coupled to a first power supply to a second power supply via the OLED to correspond to a voltage applied to a first node, a second transistor coupled between the first node and an initializing power supply and turned on when a scan signal is supplied to an (n-1)th scan line, and a third transistor turned on to supply a predetermined voltage to the second node when the scan signal is supplied to the (n-1)th scan line.

The predetermined voltage is set as a higher voltage than the initializing power supply so that an on bias voltage may be applied to the first transistor. Each of the pixels includes a fourth transistor coupled between a second and a data line and turned on when a scan signal is supplied to an nth scan line and a fifth transistor coupled between the first node and a second electrode of the first transistor and turned on when the scan signal is supplied to the nth scan line. The predetermined voltage is a high voltage supplied to the nth scan line. The organic light emitting display further includes a sixth transistor coupled between the second node and the first power supply and turned off when an emission control signal is supplied to an nth emission control line and a seventh transistor coupled between a second electrode of the first transistor and the OLED and turned off when an emission control signal is supplied to the nth emission control line. The interval of time when the emission control signal is supplied to the nth emission control line overlaps the interval of time when the scan signals are supplied to the (n-1)th scan line and the nth scan line. The predetermined voltage is a voltage of an emission control signal supplied to an (n-1)th emission control line. The organic light emitting display further includes a storage capacitor coupled between the first node and the first power supply and a boosting capacitor coupled between the nth scan line and the first node.

In the pixel according to the present invention and the organic light emitting display using the same, the on bias voltage is applied to the driving transistor before the data signal is supplied to initialize the threshold voltage of the driving transistor. Therefore, according to the present invention, it is possible to display an image with uniform brightness regardless of the image displayed in the previous frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Cathode ray tubes (CRT) have disadvantages of heavy weight and large volume. Recently, in order to overcome the disadvantages of CRTs, various flat panel displays (FPD) capable of reducing weight and volume have been developed. The FPDs include liquid crystal displays (LCD), field emission displays (FED), plasma display panels (PDP), and organic light emitting displays.

Among the FPDs, the organic light emitting displays display images using organic light emitting diodes (OILED) that generate light by re-combination of electrons and holes. The organic light emitting displays have high response speed and require low power consumption.

Generally, an organic light emitting display includes a plurality of pixels arranged in a matrix at intersections of a plurality of data lines, scan lines, and power supply lines. Each of the pixels commonly includes an organic light emitting diode (OLED) and a driving transistor for controlling the amount of current that flows to the OLED. The pixels generate light components with predetermined brightness components by supplying currents from the driving transistors to the OLEDs in response to data signals.

Figure 1:
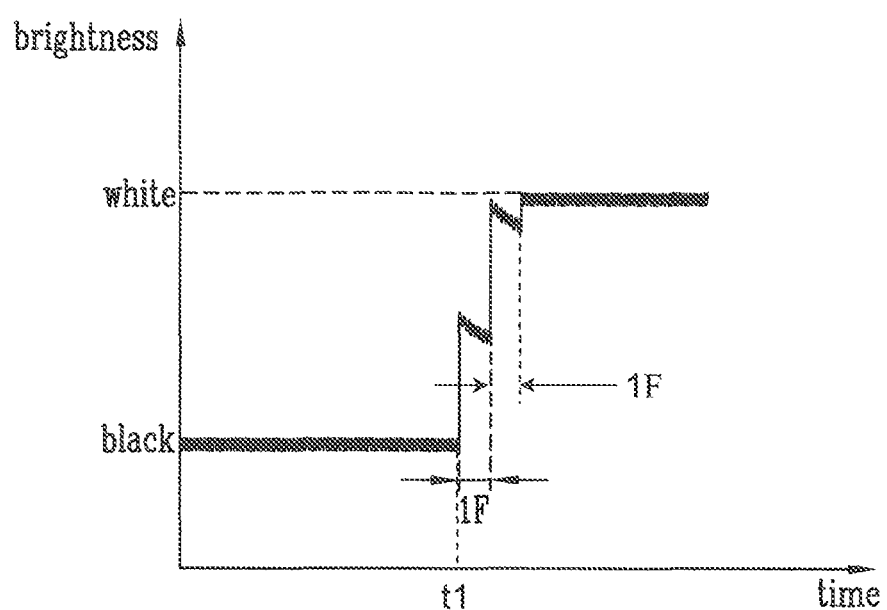
FIG. 1 is a two-coordinate graph illustrating a deviation in brightness components corresponding to gray scales.

However, in a contemporary pixel, as illustrated in FIG. 1, at t1 when a white gray scale is desired to be displayed after a black gray scale has been maintained for a period of time, light with lower brightness than the desired brightness is generated in a period of about two frames. In this case, an image with desired brightness is not displayed by the pixels corresponding to gray scales so that uniformity in brightness and picture quality of a moving picture may deteriorate.

As a result of experiments, deterioration of the response characteristic of the organic light emitting display is caused by the characteristic of the driving transistors of the pixels. That is, the threshold voltages of the driving transistors are shifted in response to voltages applied to the driving transistors in a previous frame period. Due to the shifted threshold voltages, light components with desired brightness components are not generated in a current frame.

Hereinafter, certain exemplary embodiments according to the present invention will be described with reference to the accompanying drawings. Here, when a first element is described as being coupled to a second element, the first 1'T element may be not only directly coupled to the second element but may also be indirectly coupled to the second element via a third element. Further, some of the elements that are not essential for a complete understanding of the invention are omitted for clarity. Also, like reference numerals refer to like elements throughout.

Hereinafter, a pixel and an organic light emitting display using the same will be described in detail as follows with reference to FIGS. 2 to 6 in which preferred embodiments by which those who skilled in the art may easily perform the present invention are included.

Figure 2:
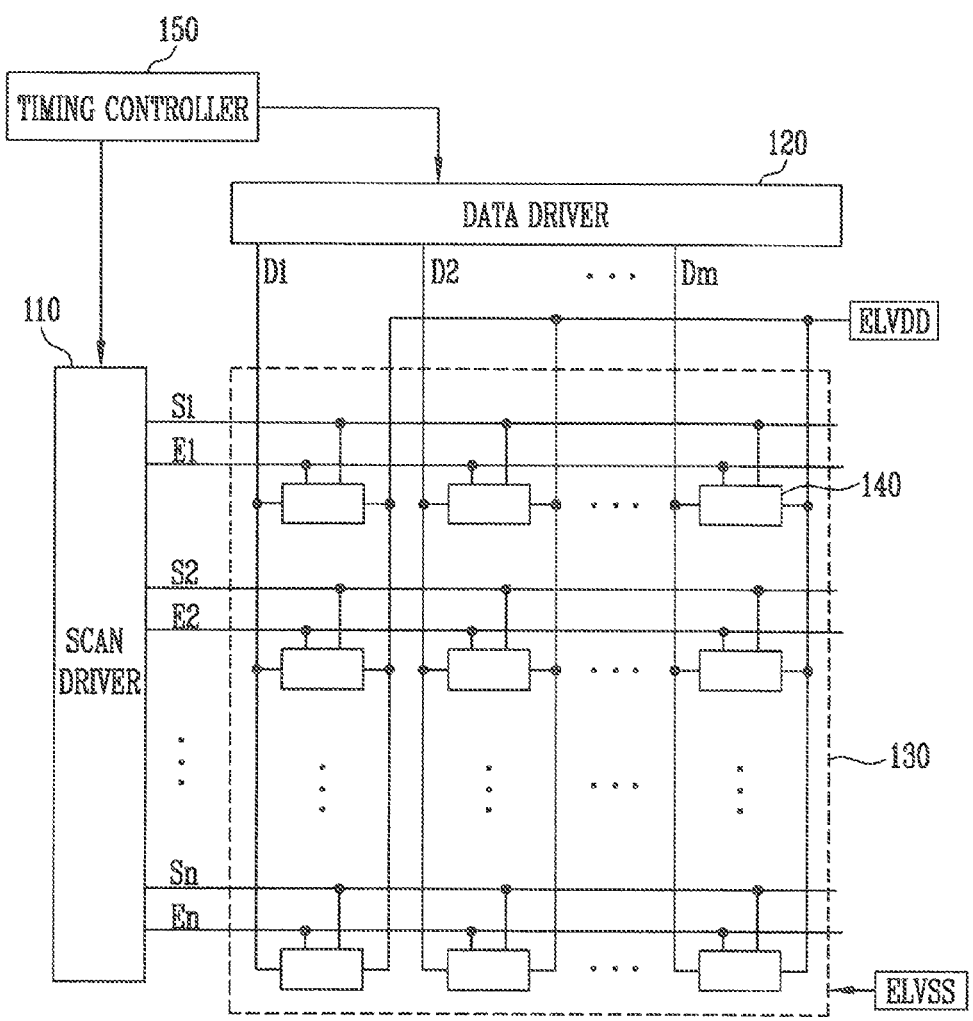
FIG. 2 is a block diagram illustrating an organic light emitting display according to an embodiment of the present invention.

FIG. 2 is a block diagram illustrating an organic light emitting display constructed according to an embodiment of the present invention.

Referring to FIG. 2, the organic light emitting display according to the embodiment of the present invention includes a pixel unit 130 including pixels 140 positioned to be coupled to scan lines S1 to Sn and data lines D1 to Dm, a scan driver 110 for driving the scan lines S1 to Sn and emission control lines E1 to En, a data driver 120 for driving the data lines D1 to Dm, and a timing controller 150 for controlling the scan driver 110 and the data driver 120.

The scan driver 110 supplies scan signals to the scan lines S1 to Sn and emission control signals to the emission control lines E1 to En in response to a control of the timing controller 150. For example, the scan driver 110 sequentially supplies the scan signals and the emission control signals to the scan lines S1 to Sn and the emission control lines E1 to En. Here, the interval of time when emission control signal is supplied to the ith (i is a natural number) emission control line Ei overlaps the interval of time when the scan signals are supplied to the (i-1)th and ith scan lines Si-1 and Si.

The scan signals supplied by the scan driver 110 are set to have a voltage at which transistors may be turned on, for example, a low-level voltage. The emission control signals supplied by the scan driver 110 are set to have a voltage at which the transistors may be turned off, for example, a high-level voltage.

The data driver 120 supplies data signals to the data lines D1 to Dm to correspond to the control of the timing controller 150. Here, the data driver 120 supplies the data signals to the data lines D1 to Dm in synchronization with the scan signals so that the data signals are supplied to the pixels 140 selected by the scan signals.

The timing controller 150 controls the scan driver 110 and the data driver 120 to correspond to synchronizing signals supplied from the outside.

The pixel unit 130 receives a first power supply ELVDD and a second power s supply ELVSS from an external source to supply the first power supply ELVDD and the second power supply ELVSS to the pixels 140, respectively. The pixels 140 that receive the first power supply ELVDD and the second power supply ELVSS generate light components with predetermined brightness components by controlling the amount of currents that flow from the first power supply ELVDD to the second power supply ELVSS via the OLEDs to correspond to the data signals, respectively.

On the other hand, in FIG. 2, the pixels 140 are coupled to the scan lines and the emission control lines that are positioned on the same horizontal line. However, the present invention is not limited to the foregoing details. Alternatively, the pixels 140 may be additionally coupled to the scan lines and/or the emission control lines that are positioned on a previous horizontal line to correspond to the structure of a pixel circuit, which will be described later with reference to a pixel structure.

Figure 3:
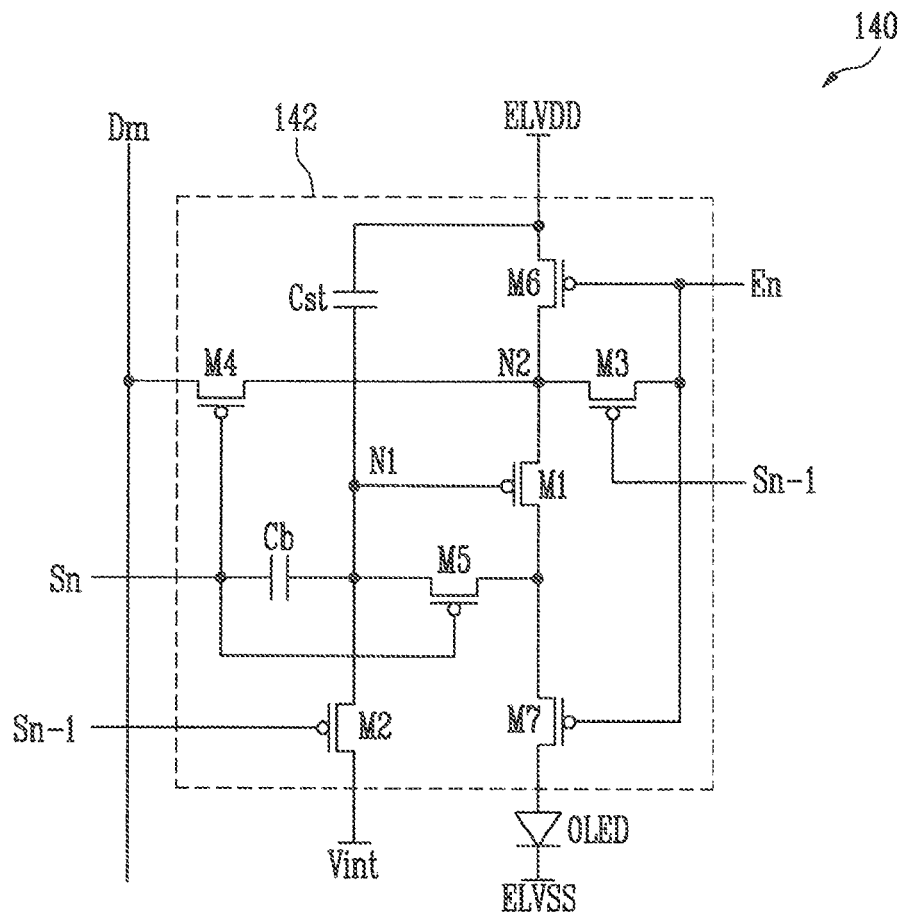
FIG. 3 is a schematic circuit diagram of a pixel according to a first embodiment of the present invention.

FIG. 3 is a schematic circuit diagram a pixel according to a first embodiment is of the present invention. In FIG. 3, for convenience sake, the pixel positioned on an nth horizontal line will be illustrated.

Referring to FIG. 3, the pixel 140 constructed according to the first embodiment of the present invention includes an organic light emitting diode (OLED) and a pixel circuit 142 coupled to the data line Dm, the scan lines Sn-1 and Sn, and the emission control line En to control the amount of current supplied to the OLED.

The anode electrode of the OLED is coupled to the pixel circuit 142 and the cathode electrode of the OLED is coupled to the second power supply ELVSS. The OLED generates light with predetermined brightness to correspond to the amount of current supplied from the first power supply ELVDD via the pixel circuit 142.

The pixel circuit 142 controls the amount of current supplied to the OLED to correspond to a data signal. More specifically, the pixel circuit 142 includes first through seventh transistors M1 to M7, a storage capacitor Cst, and a boosting capacitor Cb.

The first electrode of the first transistor M1 is coupled to a second node N2 and the second electrode of the first transistor M1 is coupled to the first electrode of the seventh, transistor M7. The gate electrode of the first transistor M1 is coupled to a first node N1. The first transistor M1 controls the amount of current supplied to the OLED in response to the voltage applied to the first node N1, that is, the voltage charged in the storage capacitor Cst.

The second transistor M2 is coupled between the first node N1 and an initializing power supply Vint. The gate electrode of the second transistor M2 is coupled to the (n-1)th scan line Sn-1. The second transistor M2 is turned on to supply the voltage of the initializing power supply Vint to the first node N1 when a scan signal is supplied to the (n-1)th scan line Sn-1. Here, the initializing power supply Vint is set to have a lower voltage than the data signal.

The first electrode of the third transistor M3 is coupled to the nth emission control line En and the second electrode of the third transistor M3 is coupled to the second node N2. The gate electrode of the third transistor M3 is coupled to the (n-1)th scan line Sn-1. When the scan signal is supplied to the (n-1)th scan line Sn-1, the third transistor M3 is turned on to supply the voltage of the nth emission control line En, that is, the emission control signal to the second node N2.

The first electrode of the fourth transistor M4 is coupled to the data line Dm and the second electrode of the fourth transistor M4 is coupled to the second node N2. The gate electrode of the fourth transistor M4 is coupled to the nth scan line Sn. When the scan signal is supplied to the nth scan line Sn, the fourth transistor M4 is turned on to electrically couple the data line Dm and the second node N2 to each other.

The first electrode of the fifth transistor M5 is coupled to the second electrode of the first transistor M1 and the second electrode of the fifth transistor M5 is coupled to the first node N1. The gate electrode of the fifth transistor M5 is coupled to the nth scan line Sn. When the scan signal is supplied to the nth scan line Sn, the fifth transistor M5 is turned on to electrically couple the gate and the second electrode of the first transistor M1. In this case, the first transistor M1 is coupled in the form of a diode.

The first electrode of the sixth transistor M6 is coupled to the first power supply ELVDD and the second electrode of the sixth transistor M6 is coupled to the second node n2. The gate electrode of the sixth transistor M6 is coupled to the nth emission control line En. The sixth transistor M6 is turned off when the emission control signal is supplied to the nth emission control line En and is turned on when the emission control signal is not supplied.

The first electrode of the seventh transistor M7 is coupled to the second electrode of the first transistor M1 and the second electrode of the seventh transistor M7 is coupled to the anode electrode of the OLED. The gate electrode of the seventh transistor M7 is coupled to the nth emission control line En. The seventh transistor M7 is turned off when the emission control signal is supplied to the nth emission control line En and is turned on when the emission control signal is not supplied.

The storage capacitor Cst is coupled between the first node N1 and the first power supply ELVDD. The storage capacitor Cst charges a voltage determined by the data signal and the threshold voltage of the first transistor M1.

The boosting capacitor Cb is coupled between the first node N1 and the nth scan line Sn. The boosting capacitor Cb controls the voltage of the first node N1 to correspond to the scan signal supplied to the nth scan line Sn. The boosting capacitor Cb used for additionally increasing the voltage of the first node N1, may be deleted during a designing process.

Figure 4:
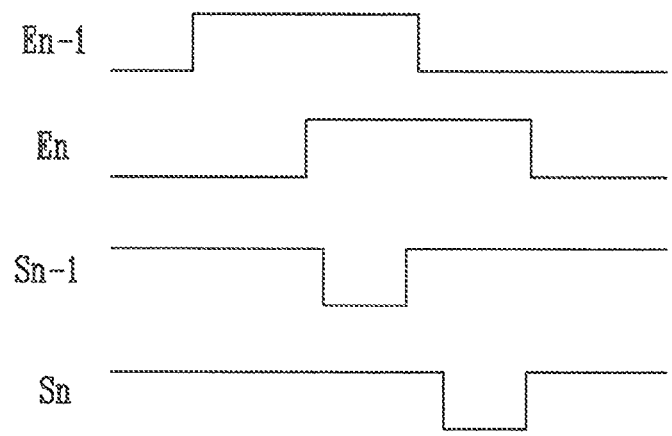
FIG. 4 is a waveform chart illustrating a method of driving the pixel of FIG. 3.

FIG. 4 is a waveform chart illustrating a method of driving the pixel of FIG. 3.

Referring to FIG. 4, first, a high-level emission control signal is supplied to the emission control line En so that the sixth transistor M6 and the seventh transistor M7 are turned off When the sixth transistor M6 is turned off, the first power supply ELVDD and the second node N2 are electrically insulated from each other. When the seventh transistor M7 is turned off, the first transistor M1 and the OLED are electrically insulated from each other.

Then, a low-level scan signal is supplied to the (n-1)th scan line Sn-1. When the low-level scan signal is supplied to the (n-1)th scan line Sn-1, the second transistor M2 and the third transistor M3 are turned on. When the second transistor M2 is turned on, the voltage of the initializing power supply Vint is supplied to the first node N1. When the third transistor M3 is turned on, the high-level emission control signal is supplied to the second node N2.

Here, since the initializing power supply Vint is set as a lower voltage than the data signal and the high-level emission control signal is set as a high voltage at which the transistors may be turned off, an on bias voltage is applied to the first transistor M1. In other words, the first transistor M1 is initialized to the on bias voltage in a period when the low-level scan signal is supplied to the (n-1)th scan line Sn-1.

Then, a low-level scan signal is supplied to the nth scan line Sn so that the fourth transistor M4 and the fifth transistor M5 are turned on. When the fifth transistor M5 is turned on, the first transistor M1 is coupled in the form of a diode. When the fourth transistor M4 is turned on, the data signal from the data line Dm is supplied to the second node N2.

At this time, since the first node N1 is set as the voltage of the initializing power supply Vint lower than the data signal, the first transistor M1 is turned on. When the first transistor M1 is turned on, a voltage obtained by subtracting the threshold voltage of the first transistor M1 from the data signal is supplied to the first node N1. The storage capacitor Cst charges a predetermined voltage in response to the voltage applied to the first node N1.

On the other hand, when the supply of the low-level scan signal to the nth scan line Sn is stopped, the voltage of the first node N1 is increased by the boosting capacitor Cb. For example, the voltage of the first node N1 increases to correspond to an amount of change in the voltage of the nth scan line Sn (that is, a high voltage in the scan signal). The boosting capacitor Cb increases the voltage of the first node N1 to compensate for the voltage of the data signal that is lost by the parasitic capacitor of the data line Dm.

After the predetermined voltage has charged into the storage capacitor Cst, the supply of the high-level emission control signal to the emission control line En is stopped so that the sixth transistor M6 and the seventh transistor M7 are turned on. When the sixth transistor M6 and the seventh transistor M7 are turned on, a current path is formed from the first power supply ELVDD to the second power supply ELVSS via the OLED. At this time, the first transistor M1 controls the amount of current supplied to the OLED in response to the voltage charged in the storage capacitor Cst.

In the above-described present embodiment, the on bias voltage is applied to the first transistor M1 in a period when the low-level scan signal is supplied to the (n-1)th scan line Sn-1. When the on bias voltage is applied to the first transistor M1, the characteristic curve (or the threshold voltage) of the first transistor M1 is initialized to a uniform state. When the characteristic curve of the first transistor M1 is initialized to the uniform state, it is possible to display an image with uniform brightness on the pixel unit 130 regardless of the image displayed in a previous frame period.

Figure 5:
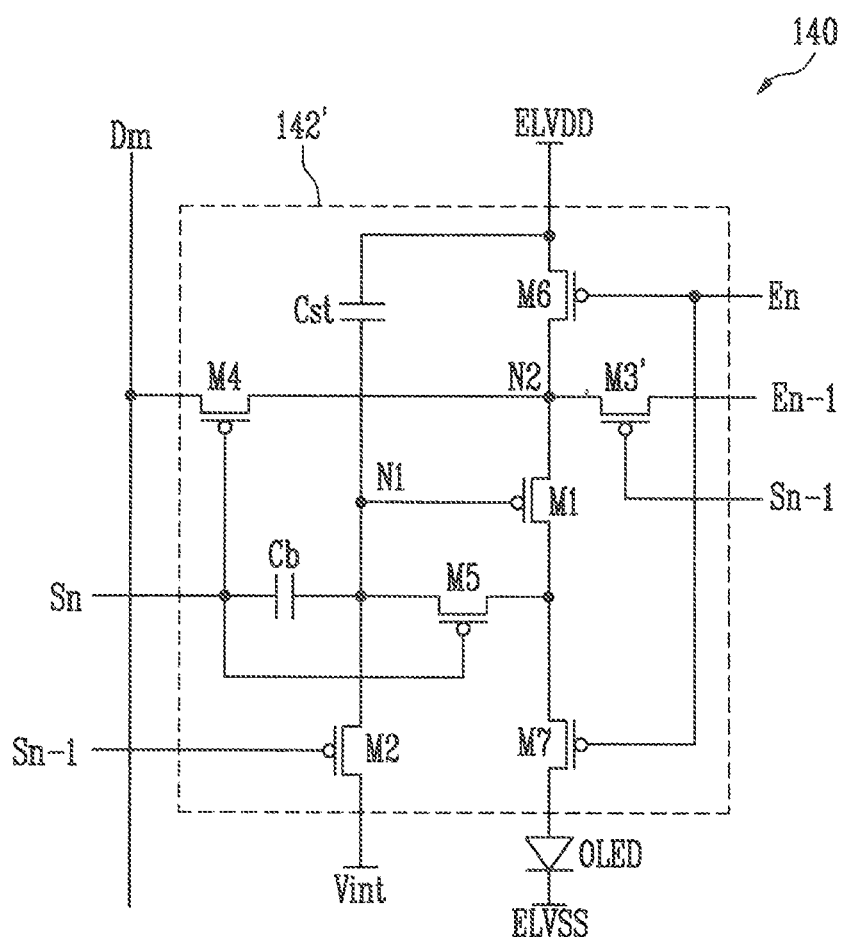
FIG. 5 is a schematic circuit diagram of a pixel according to a second embodiment of the present invention.

FIG. 5 is a schematic circuit diagram of a pixel according to a second embodiment of the present invention. In FIG. 5, for convenience sake, the same components as those of FIG. 3 are denoted by the same reference numerals and detailed description thereof will be omitted.

Referring to FIG. 5, the pixel 140 according to the second embodiment of the present invention includes a pixel circuit 142' and an OLED. The OLED generates light with predetermined brightness to correspond to current supplied from the pixel circuit 142'.

The pixel circuit 142' controls the amount of current supplied to the OLED to correspond to a data signal. The first electrode of a third transistor M3' included in the pixel circuit 142' is coupled to the (n-1)th emission control line En-1 and the second electrode of the third transistor M3' is coupled to the second node N2. The gate electrode of the third transistor M3' is coupled to the (n-1)th scan line Sn-1. When a scan signal is supplied to the (n-1)th scan line Sn-1, the third transistor M3' is turned on to supply the voltage of the (n-1)th emission control line En-1, that is, the emission control signal is applied to the second node N2.

Describing the above in detail, when a low-level scan signal is supplied to the (n-1)th scan line Sn-1, the second transistor M2 and the third transistor M3' are turned on. When the second transistor M2 is turned on, the voltage of the initializing power supply Vint is supplied to the first node N1. When the third transistor M3' is turned on, a high-level emission control signal supplied to the (n-1)th emission control line En-1 is supplied to the second node N2. In this case, the first transistor M1 is initialized to the on bias voltage.

That is, in the second embodiment of the present invention, the third transistor M3' supplies the high-level emission control signal from the (n-1)th emission control line En-1 to the second node N2. Since the other driving processes are the same as those of the first embodiment of the present invention, detailed description thereof will be omitted.

Figure 6:
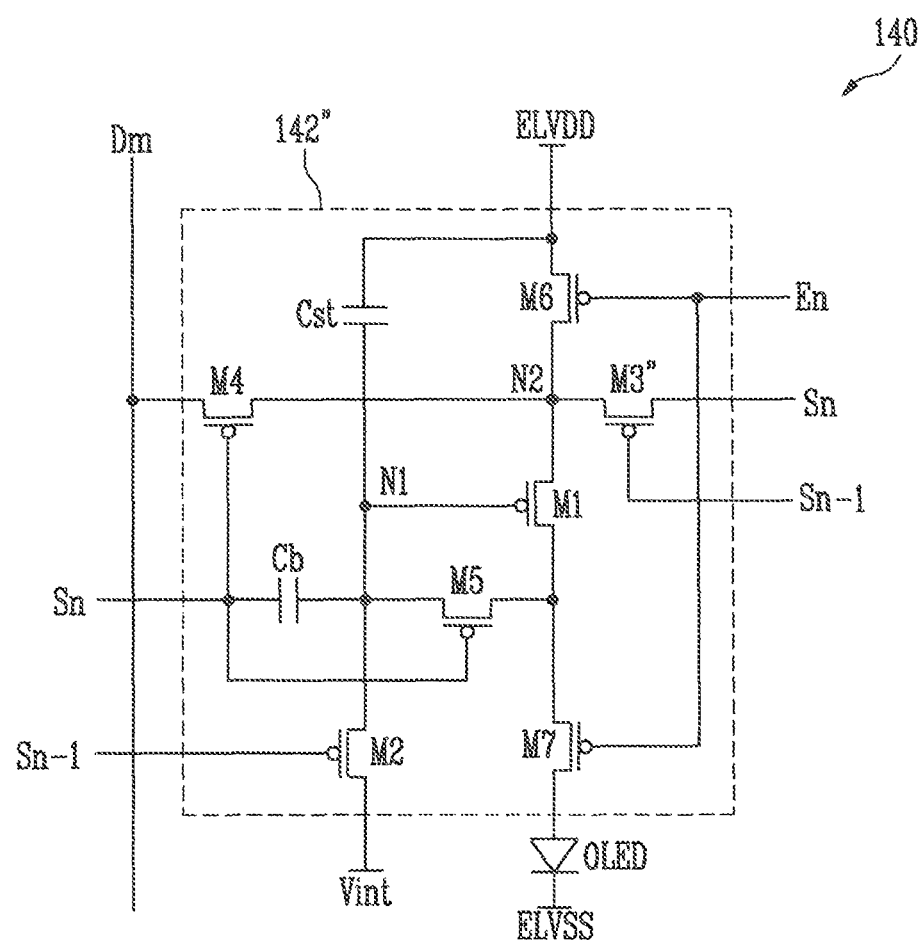
FIG. 6 is a schematic circuit diagram of a pixel according to a third embodiment of the present invention.

FIG. 6 is a schematic circuit diagram of a pixel according to a third embodiment of the present invention. In FIG. 6, for convenience sake, the same components as those of FIG. 3 are denoted by the same reference numerals and detailed description thereof will be omitted.

Referring to FIG. 6, the pixel 140 constructed according to the third embodiment of the present invention includes a pixel circuit 142" and an OLED. The OLED generates light with predetermined brightness to correspond to current supplied from the pixel circuit 142".

The pixel circuit 142" controls the amount of current supplied to the OLED to correspond to a data signal. The first electrode of a third transistor M3" included in the pixel circuit 142" is coupled to the nth scan line Sn and the second electrode of the third transistor M3" is coupled to the second node N2. The gate electrode of the third transistor M3" is coupled to the (n-1)th scan line Sn-1. When a scan signal is supplied to the (n-1)th scan line Sn-1, the third transistor M3" is turned on to supply the voltage of the nth scan line Sn, that is, a high voltage to the second node N2.

Describing the foregoing in detail, when a low-level scan signal is supplied to the (n-1)th scan line Sn-1, the second transistor M2 and the third transistor M3" are turned on. When the second transistor M2 is turned on the voltage of the initializing power supply Vint is supplied to the first node N1. When the third transistor M3" is turned on, the voltage of the nth scan line Sn is supplied to the second node N2. Here, the voltage of the nth scan line Sn is set as a high-level voltage at which the transistors may be turned off, for example, the same voltage as the emission control signal. The first transistor M1 is initialized to the on bias voltage in a period when the low-level scan signal is supplied to the (n-1)th scan line Sn-1.

That is, in the third embodiment of the present invention, the third transistor M3" supplies the high-level voltage from the nth scan line Sn to the second node N2. Since the other driving processes are the same as those of the first embodiment of the present invention, detailed description thereof will not be repeated.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel, comprising:
   an organic light emitting diode (OLED);
   a first transistor controlling an amount of current that flows from a second node coupled to a first power supply to a second power supply via the OLED in response to a voltage applied to a first node;
   a second transistor coupled between the first node and an initializing power supply; and
   a third transistor turned on to supply a predetermined voltage to the second node at the moment when the second transistor is turned on, the third transistor coupled between the second node and one of an nth(where n is a natural number) emission control line, and an (n-1)th emission control line, and a gate of the second transistor and a gate of the third transistor are connected to an (n-1)th scan line.

2. The pixel as claimed in claim 1, wherein the predetermined voltage is set as a higher voltage than a voltage of the initializing power supply.

3. The pixel as claimed in claim 1, wherein the second transistor and the third transistor are turned on when a scan signal is supplied to the (n-1)th scan line.

4. The pixel as claimed in claim 3, further comprising:
a fourth transistor coupled between the second node and a data line and turned on when a scan signal is supplied to an nth scan line; and
a fifth transistor coupled between the first node and a second electrode of the first transistor and turned on when the scan signal is supplied to the nth scan line.

5. The pixel as claimed in claim 4, wherein the predetermined voltage is higher than a voltage of the scan signal.

6. The pixel as claimed in claim 3, further comprising:
a sixth transistor coupled between the second node and the first power supply and turned off when an emission control signal is supplied to the nth emission control line; and
a seventh transistor coupled between a second electrode of the first transistor and the OLED and turned off when an emission control signal is supplied to the nth emission control line.

7. The pixel as claimed in claim 6, wherein the predetermined voltage is a voltage of the emission control signal.

8. The pixel as claimed in claim 4, further comprising:
a storage capacitor coupled between the first node and the first power supply; and
a boosting capacitor coupled between the nth scan line and the first node.

9. An organic light emitting display device, comprising:
a scan driver sequentially supplying scan signals to scan lines and sequentially supplying emission control signals to emission control lines;
a data driver supplying data signals to data lines; and
pixels positioned at intersections of the scan lines and the data lines,
each of the pixels positioned on an nth (n is a natural number) horizontal line comprising:
an organic light emitting diode (OLED);
a first transistor controlling an amount of current that flows from a second node coupled to a first power supply to a second power supply via the OLED in response to a voltage applied to a first node;
a second transistor coupled between the first node and an initializing power supply and turned on when a scan signal is supplied to an (n-1)th (n is a natural number) scan line; and
a third transistor turned on to supply a predetermined voltage to the second node when the scan signal is supplied to the (n-1)th scan line, the third transistor coupled between the second node and one of an nth (where n is a natural number) emission control line, and an (n-1)th emission control line, and a gate of the second transistor and a gate of the third transistor are connected to the (n-1)th scan line.

10. The organic light emitting display device as claimed in claim 9, wherein the predetermined voltage is set as a higher voltage than a voltage of the initializing power supply so that an on bias voltage is applied to the first transistor.

11. The organic light emitting display device as claimed in claim 9, wherein each of the pixels comprises:
a fourth transistor coupled between the second node and a data line and turned on when a scan signal is supplied to an nth scan line; and
a fifth transistor coupled between the first node and a second electrode of the first transistor and turned on when the scan signal is supplied to the nth scan line.

12. The organic light emitting display device as claimed in claim 11, wherein the predetermined voltage being higher than a voltage of the scan signal.

13. The organic light emitting display device as claimed in claim 9, further comprising:
a sixth transistor coupled between the second node and the first power supply and turned off when an emission control signal is supplied to the nth emission control line; and
a seventh transistor coupled between a second electrode of the first transistor and the OLED and turned off when an emission control signal is supplied to the nth emission control line.

14. The organic light emitting display device as claimed in claim 13, wherein the interval of time when the emission control signal is supplied to the nth emission control line overlaps the interval of time when scan signals are supplied to the (n-1)th scan line and the nth scan line.

15. The organic light emitting display device as claimed in claim 14, wherein the predetermined voltage is a voltage of an emission control signal supplied to the (n-1)th emission control line.

16. The organic light emitting display device as claimed in claim 14, wherein the predetermined voltage is a voltage of the emission control signal supplied to the nth emission control line.

17. The organic light emitting display device as claimed in claim 11, further comprising:
a storage capacitor coupled between the first node and the first power supply; and
a boosting capacitor coupled between the nth scan line and the first node.

* * * * *